United States Patent
Becker

[15] 3,679,043
[45] July 25, 1972

[54] ROLLER TRANSFER CONVEYOR

[72] Inventor: Raymond M. Becker, Oden, Mich.

[73] Assignee: Jervis B. Webb Company

[22] Filed: April 13, 1971

[21] Appl. No.: 133,491

[52] U.S. Cl. .................................... 198/105, 193/35 MD
[51] Int. Cl. ............................................. B65g 37/00
[58] Field of Search ............... 193/35 MD, 36, 37; 198/105, 198/21, 25

[56] References Cited

UNITED STATES PATENTS

| 461,901 | 10/1891 | Allis | 198/105 X |
| 3,552,541 | 1/1971 | Riggs | 193/37 X |
| 1,123,851 | 1/1915 | Cooper | 193/35 MD |
| 2,789,708 | 4/1957 | Payne | 193/35 MD X |

OTHER PUBLICATIONS

Kornylak Corp., bulletin 2003 (Transweel) July 15, 1970 pp. 1-8

*Primary Examiner*—Richard E. Aegerter
*Assistant Examiner*—Douglas D. Watts
*Attorney*—Farley, Forster & Farley

[57] ABSTRACT

A conveyor for moving articles such as pallets in a main path and selectively in a transfer path at right angles to the main path. The article is supported by a plurality of generally spherical elements mounted at desired intervals along each of a plurality of parallel shafts. Each spherical element consists of a pair of spherical segments forming portions of a sphere centered on a shaft and rotatable therewith, the segments being independently rotatable on an axis normal to the shaft. When the shafts are rotated by driving means, an article is moved by the elements in the main path. When the shafts are stopped with the axes of rotation of the spherical segments at about 45° to the base plane of an article, it is movable in the transfer path with independent rotation of the spherical segments which the article engages.

14 Claims, 7 Drawing Figures

Patented July 25, 1972

INVENTOR
RAYMOND M. BECKER

BY
Farley, Forster and Farley

ATTORNEYS

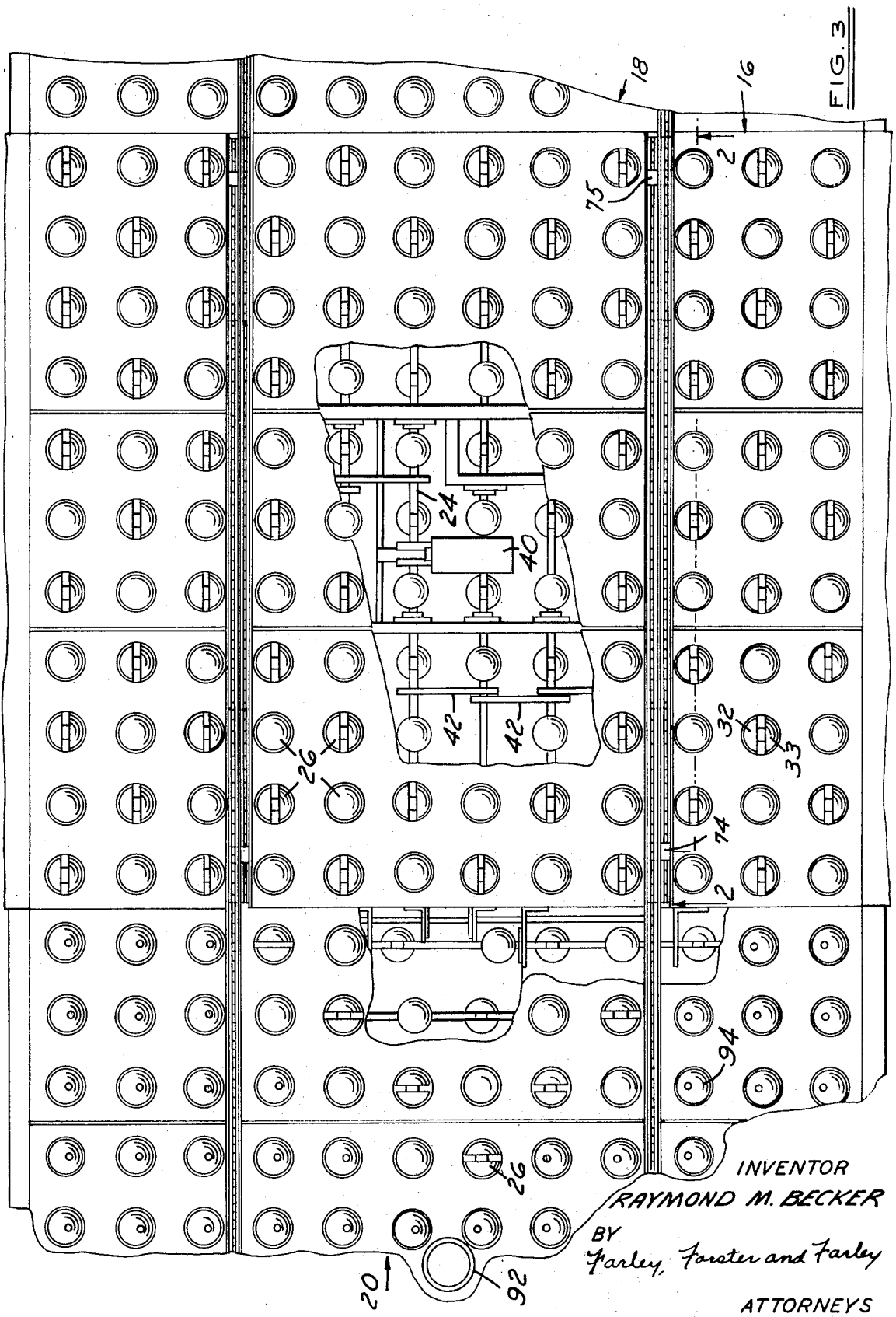

Patented July 25, 1972
3,679,043
3 Sheets-Sheet 3
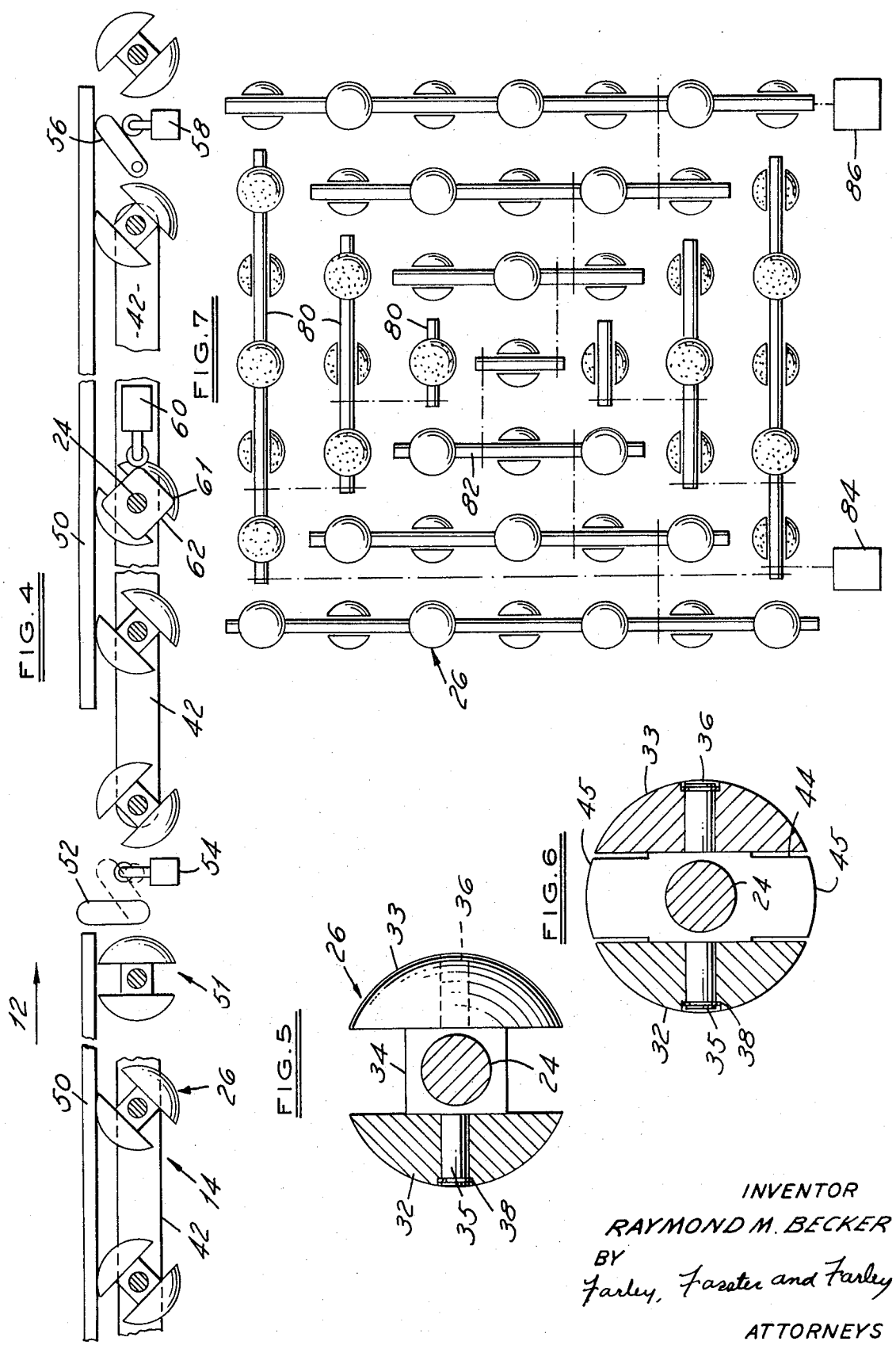
INVENTOR
RAYMOND M. BECKER
BY
Farley, Forster and Farley
ATTORNEYS

ROLLER TRANSFER CONVEYOR

SUMMARY OF THE INVENTION

This invention relates to improvements in a conveyor of the type in which an article such as a pallet or container is supported on a plurality of rotatable elements and is movable in a main path and in a transfer path transversely to the main path.

In the handling of articles such as relatively heavy palletized loads or shipping containers, it is frequently desirable to shift the article at right angles to the path of a main conveyor onto a branch conveyor or a station to one side of the main conveyor. Prior conveyors capable of imparting such a bi-directional movement to an article have in general either employed two sets of vertically shiftable article supporting elements, one set for each direction of movement, or a group of article supporting elements such as individual wheels which can be moved in unison about vertical pivots. Both of these prior types are relatively complicated structurally, particularly where the article supporting elements are power driven.

One of the principal objects of the present invention is to provide a conveyor on which articles can be moved in a main path and in a path at right angles thereto by the same article supporting elements, and without the necessity of changing the orientation of these elements relative to each other or to the main path of travel. Another object is to provide a conveyor having powered article supporting elements which have improved directional control over the movement of an article.

A conveyor constructed in accordance with the invention has a plurality of spaced parallel shafts mounted on suitable frame structure, with each shaft having a plurality of article supporting elements mounted thereon in spaced relation longitudinally of the shaft for rotation therewith. Each article supporting element includes a pair of spherical segments independently rotatable on an axis normal to the axis of the shaft, the pair of segments forming portions of the sphere whose center is coincident with the axis of the shaft. The shafts are rotatable in unison by suitable driving means so that the article supporting elements on the shafts are capable of moving an article engaged thereby in a direction normal to the axes of the shafts, which direction may be considered that of a main path of article travel. In order to move the article in a path at right angles to the main path, rotation of the shafts is stopped when the axes on which the spherical segments are independently rotatable lie at angles of about 45° to the article supporting plane of the conveyor, enabling an article to be moved in a direction parallel to the axes of the shafts with independent rotation of the spherical segments engaged by the article.

Each pair of spherical segments is carried by a hub mounted on a shaft, the hub having a pair of oppositely projecting axles on which the spherical segments can independently rotate. In one form of construction, the hub spaces the spherical segments to either side of the shaft, leaving a gap between them; and, in this construction, adjacent article supporting elements are arranged so that the axis of rotation of the spherical segments of one article supporting element is in perpendicular relation to the axis of rotation of the next article supporting element. This arrangement is carried out from element to element on the same shaft and on adjacent shafts so that when the driving means is operated, an article is engageable by at least one-half of the spherical segments at any one time. In another form of construction, the pair of spherical segments and hub form a substantially complete sphere at least with respect to the engagement that takes place between an article and the supporting elements when the shafts are rotated.

In another form on conveyor construction, the shafts on which the article supporting elements are mounted are arranged in two groups, the axes of the shafts of one group being in right angular relation to the axes of the shafts in the other group. Rotation of the shafts of one group causes an article to be moved in one of two right angular directions, this article movement being accompanied by independent rotation of spherical segments of the supporting elements of the other group.

Other features and advantages of the invention will appear from the following description of the representative embodiments thereof disclosed in the accompanying drawings.

DESCRIPTION OF THE DRAWINGS

FIG. 3 is an enlarged plan view of the transfer portion of the conveyor of FIG. 1;

FIG. 4 is a schematic elevation illustrating movement of an article over the portion of the conveyor indicated by the arrows 4—4 of FIG. 1;

FIG. 5 is an enlarged sectional elevation showing the construction of one of the article supporting elements;

FIG. 6 is an enlarged sectional elevation similar to FIG. 5 showing an alternate construction of one of the article supporting elements; and, FIG. 7 is a schematic plan view of an alternate construction for the transfer section of the conveyor.

DESCRIPTION OF THE PREFERRED EMBODIMENTS

Figure 1:
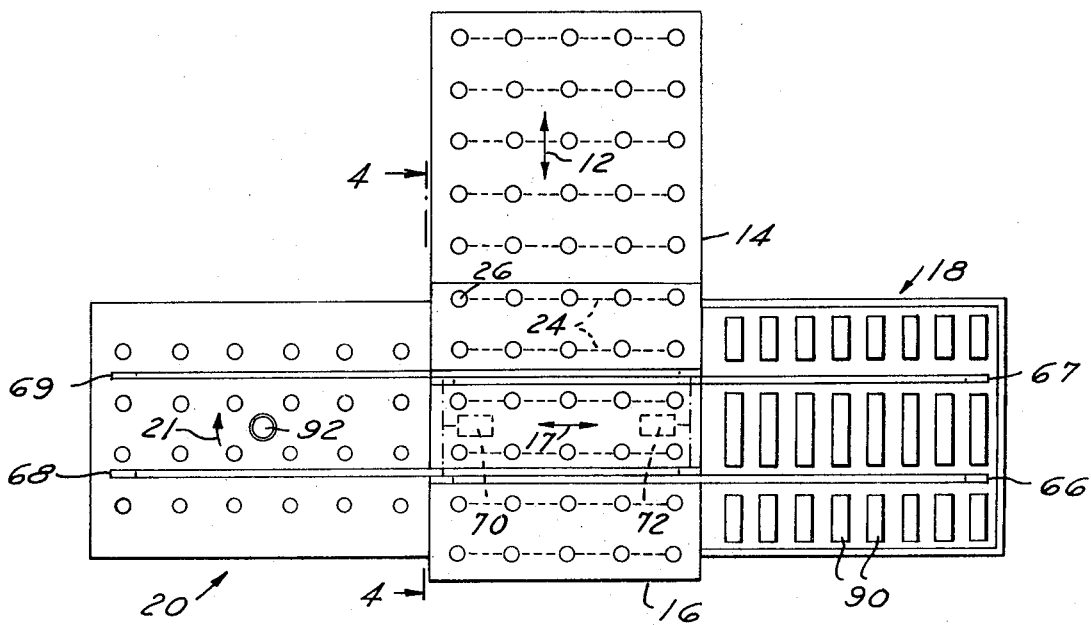
FIG. 1 is a schematic plan view of a portion of a conveyor constructed in accordance with the invention.

FIG. 1 illustrates a conveyor of modular construction for the handling of articles such as palletized loads or shipping containers in an air freight terminal. The conveyor is arranged to provide a reversible main path of travel indicated by the arrow 12 made up of a conveying module 14, a transfer module 16 and any succession of either or both of these modules that may be desired. Located to one side of the transfer module 16 is a storage module 18, and ordinarily a plurality of these storage modules will be arranged along the main path of travel to either or both sides thereof, each storage module or oppositely disposed pairs of storage modules being adjacent to one of the transfer modules 16. Opposite the storage module 18 illustrated is a turntable. module 20. This is a special module which may be required in cases where the palletized load or container is only accessible from one end thereof for performing loading or unloading operations at one of the storage modules 18 of the conveyor, the turntable module enabling the articles to be properly oriented with respect to the storage module to which it is to be delivered, by manually rotating an article as indicated by the arrow 21.

An article supported on the transfer module 16 can be moved in either of the directions indicated by the arrow 12, and can also be moved in either of the directions at right angles thereto as indicated by the arrow 17. The ability to move an article in the directions 12 or 17 results from the construction of the invention, more fully described in FIGS. 2–5.

Figure 2:
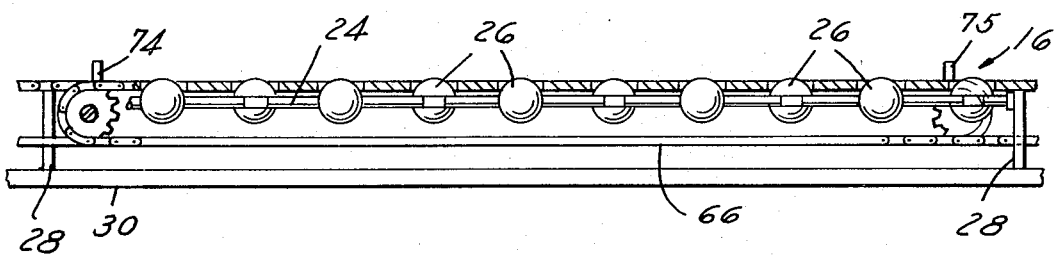
FIG. 2 is an enlarged sectional elevation taken as indicated by the line 2—2 of FIG. 3.

This construction includes a plurality of parallel shafts 24 extending transversely to the directions 12, and a plurality of article supporting elements 26 mounted in spaced relation along each of the shafts 24. The shafts are supported in suitable frame structure 28 and the elements 26 define an article supporting plane. Preferably, the frame structure 28 is relatively low in profile, as illustrated in FIG. 2, and designed so that each of the modules of the conveyor can be mounted on a floor 30.

Each of the article supporting elements 26 (FIG. 5) consists of a pair of spherical segments 32 and 33 which are supported by mounting means for independent rotation on an axis normal to the axis of the shaft 24, the pair of segments 32 and 33 being spaced to either side of the shaft so as to form portions of a sphere, the center of which is coincident with the axis of the shaft. The mounting means comprises a hub 34 mounted on a shaft 24 for rotation therewith and having a pair of oppositely projecting axles 35 and 36 on which the segments 32 and 33 are rotatably mounted and secured by suitable retaining rings 38.

As shown in FIG. 3, one of the shafts 24 is coupled to and is rotatable by a drive unit 40, and this rotation is transmitted to other shafts 24 by chain and sprocket connections 42. When the drive unit 40 is activated and the shafts are rotated, an article engaged by the elements 26 on the shafts 24 will be advanced in the direction normal to the axes of the shafts 24, or in other words, in either of the directions 12.

In order to provide continuous support of an article, the elements 26 are arranged so that the axes on which their spherical segments 32 and 33 are independently rotatable lie in alternate 90° relationship. This is best shown in FIGS. 3 and 4. Each of the shafts 24 defines a row of the elements 26 which are mounted thereon so that the axis of independent rotation of the spherical segments 32 and 33 of each element in the row lies in a 90° relationship to each adjacent element in the row. This relationship also applies with respect to adjacent rows. As a result, when the gap between the spherical segments 32 and 33 of one element 26 is upper most, a spherical segment of four adjacent elements 26 is in position to support an article. In most instances, the bottom of an article will have sufficient rigidity to be adequately supported by this arrangement of elements 26. However, the alternate construction shown in FIG. 6 can be employed if desired. This construction employs a hub 44 which includes a portion 45 in the shape of a spherical segment, the portion 45 together with the segments 32 and 33 constituting substantially a complete spherical periphery in a direction perpendicular to the axis of the shaft 24.

Operation of the conveyor of FIG. 1 with respect to movement of an article in one of the directions 12 is illustrated in FIG. 4, which assumes that an article 50 is being moved by rotation of the supporting elements 26 of the module 14 in the direction of the transfer module 16, and it is desired to stop the article on the transfer module 16 in a position in which the article can be transferred to one of the modules 18 or 20. As the article 50 passes over the first row 51 of supporting elements of the transfer module 16, which are not powered, the article contacts an actuator 52 which closes a normally open limit switch 54. This energizes the drive unit 40 of the transfer module, and the article is advanced by rotation of the powered supporting elements 26 thereof and contacts an actuator 56 which opens a normally closed limit switch 58. The limit switch 58 and a second normally closed limit switch 60 are arranged in parallel in the circuit to the motor of the drive unit 40. The limit switch 60 is actuated by one of the lobes 61 of a cam 62 mounted on one of the shafts 24, the lobes 61 being arranged at 90° intervals relative to the axis of the shaft 24 and in relation to the axes of independent rotation of the spherical segments 32 and 33 such that when the limit switch 60 is actuated by one of the lobes 61 these axes lie at angles of approximately 45° to the article supporting plane of the conveyor.

When the limit switch 58 is actuated, the drive unit continues to operate until the limit switch 60 is also actuated by one of the lobes 61. This breaks the circuit to the drive unit 40 which is equipped with a suitable braking device such as a magnetic brake so that the unit stops and the axes of independent rotation of the spherical segments 32 and 33 of all driven article supporting elements 26 lie in the aforementioned 45° relationship to the article supporting plane. With the supporting elements 26 positioned in this manner, the article 50 can be moved in either of the directions 17, and the transfer module 16 and adjacent modules 18 and 20 may be equipped with a suitable auxiliary power device for moving the article in a direction parallel to the axes of the shafts 24, this movement of the article being accompanied by rotation of the spherical segments 32 or 33 which support the article.

In the construction illustrated in FIGS. 1–3, the auxiliary conveying device consists of a pair of transfer chains 66 and 67 extending between the transfer modules 16 and storage module 18, and a second pair of transfer chains 68 and 69 extending between the transfer module 16 and turntable module 20. A drive motor 70 (FIG. 1) is arranged to drive the transfer chains 67 and 68; a second motor 72 drives the transfer chains 68 and 69. As illustrated in FIG. 2, each set of transfer chains is equipped with suitable pushers 74 and 75.

An alternate construction of a transfer module 16 is illustrated in FIG. 7. The shafts on which the article supporting elements 26 are mounted are arranged in two groups. All of the shafts 80 of one group are parallel to each other and perpendicular to all of the shafts 82 in the other group. In a sense, the shafts are arranged in quandrants about the center of the transfer unit, one quandrant being composed of the shafts 80 of one group and the adjacent quandrant being composed of shafts 82 of the other group; and, the shafts of each quandrant gradually increase in length from the center of the module outwardly toward the sides thereof.

All of the shafts 80 are coupled to a drive unit 84, and all of the shafts 82 are coupled to a drive unit 86. Each of the drive units 84 and 86 is controlled in the manner illustrated in FIG. 4, and these units would be preferably suitably interlocked so that only one can be operated at any given time. Thus, when one of the drive units 82 and 84 is stopped, the group of shafts coupled thereto would be positioned so that the axes of independent rotation of the spherical segments 32 and 33 of the supporting elements 26 carried by these shafts lie in approximate 45° relationship to the article supporting plane. Actuation of the other drive unit enables an article to be advanced by rotation of the group of shafts and article supporting elements driven thereby, this article movement being accompanied by independent rotation of the spherical segments 32 and 33 of the article supporting elements 26 carried by the shafts of the other group.

Certain other features and modifications will be briefly mentioned. In FIG. 1, the module 14 forming part of the main path of article travel is shown as having an article supporting plane formed by a plurality of the elements 26, constructed as shown in either of FIGS. 5 or 6. Obviously, some other form of construction, such as a conventional live roller conveyor, could be employed for this module. It is believed, however, that the construction illustrated will be preferable in many instances because more uniform tracking between an article and the conveyor results from the plurality of point contacts between the article and the supporting elements 26.

In the case of the storage module 18, uniform tracking may not be as important because of the relatively smaller distance the article would ordinarily travel, and the article supporting surface may advantageously be formed by a plurality of free rollers 90, as illustrated. Alternately, a live roller conveyor section could be used, thereby eliminating the necessity for the auxiliary transfer chains 67 and 68.

The turntable module 20 is equipped with a pressure pad 92 moveable upwardly into engagement with the bottom of an article to form a pivot about which the article may be rotated. The article supporting plane of this module 20 may be formed by a combination of the article supporting elements 26 and conventional 45° free rollers 94, and the elements 26 on this module may be powered or free, as desired. Alternately, this module may have an article supporting surface in the form of a conventional ball table.

A conveyor having an article supporting plane defined by the elements 26 could obviously include curved sections in which case the shafts 24 on which the elements 26 are mounted would not be arranged in mutually parallel relation.

What is claimed is:

1. In a conveyor having frame structure and a plurality of article supporting elements mounted thereon so as to define an article supporting plane, the improvement comprising:

a plurality of spaced shafts mounted on the frame structure, each shaft having a plurality of article supporting elements mounted thereon in spaced relation longitudinally of such shaft for rotation therewith;

each article supporting element including a pair of spherical segments, and mounting means rotatably supporting the pair of spherical segments on an axis normal to the axis of the shaft and with the pair of segments forming portions of a sphere whose center is coincident with the axis of the shaft; and, drive means operable to rotate at least some of the shafts in unison whereby the article supporting elements are capable of moving an article engaged thereby in directions normal to the axes of the shafts and to arrest such rotation of the shafts when the axes of the spherical segments lie at angles of about 45° relative to the article supporting plane whereby an article may be moved in a direction parallel to the axes of the shafts with rotation of the spherical segments engaged by the article.

2. A conveyor according to claim 1 wherein the mounting means of adjacent article supporting elements are arranged so that the axis of rotation of the spherical segments of one article supporting element is in perpendicular relation to the axis of rotation of the spherical segments of an adjacent article supporting element.

3. A conveyor according to claim 1 wherein the article supporting elements are mounted on the shafts in substantially parallel rows, and wherein the axis of rotation of the spherical segments of one article supporting element lies in substantially perpendicular relation to the axes of rotation of the spherical segments of adjacent article supporting elements in the same row and to the axes of rotation of the spherical segments of adjacent article supporting elements in an adjacent row.

4. A conveyor according to claim 1 wherein the axes of rotation of the spherical segments of the article supporting elements are arranged so that an article is engageable by at least one-half of the spherical segments at any one time when the drive means is operated.

5. A conveyor according to claim 1 wherein the mounting means for the spherical segments of each article supporting element comprises a hub fixed to a shaft, and a pair of axles carried by the hub and extending oppositely therefrom on a common axis normal to the axis of such shaft, the pair of spherical segments being rotatably supported on the pair of axles.

6. A conveyor according to claim 5 wherein said hub includes a portion in the shape of a spherical segment, which portion together with said pair of spherical segments forms substantially a complete spherical surface circumferentially of the shaft.

7. A conveyor according to claim 1 wherein the drive means includes a drive unit, drive transmitting means coupling the drive unit to the shafts, and control means for stopping the drive unit and shafts when the axes of the spherical segments lie in said angular relation of about 45° to the article supporting plane.

8. A conveyor according to claim 1 further including control means responsive to movement of an article by rotation of the shafts for stopping such rotation when such article arrives at a selected position on the conveyor and the shafts turn to positions in which the axes of the spherical segments lie in said angular relation of abOut 45° to the article supporting plane.

9. A conveyor according to claim 1 further including pusher means engageable with an article supported on the conveyor for moving such article in the direction parallel to the axes of the shafts.

10. A conveyor according to claim 9 wherein the pusher means are capable of moving an article in either direction parallel to the axes of the shafts.

11. A conveyor according to claim 1 further including means forming a station to which an article can be transferred by movement in the direction parallel to the axes of said shafts, and means for moving such article in the direction parallel to the axes of the shafts for transferring the article to and from said station.

12. A conveyor according to claim 11 wherein the means for moving such article includes a pusher.

13. A conveyor according to claim 1 wherein the shafts are arranged in two groups, all of the shafts in one group being parallel to each other and perependicular to all of the shafts in the other group, and wherein the drive means is operable to rotate at least some of the shafts of one of the groups.

14. A conveyor according to claim 13 further including second drive means for rotating at least some of the shafts of the other group when the drive means for the shafts of the first group is stopped with the axes of the spherical segments of the supporting elements carried thereby positioned in said angular relation of about 45° to the article supporting plane.

* * * * *